(12) United States Patent
Mori et al.

(10) Patent No.: US 8,675,070 B2
(45) Date of Patent: Mar. 18, 2014

(54) DRIVING SUPPORT DEVICE, DRIVING SUPPORT METHOD, AND DRIVING SUPPORT PROGRAM

(75) Inventors: Toshihiro Mori, Aichi-ken (JP); Yuuichi Ooshita, Aichi-ken (JP)

(73) Assignee: Aisin AW Co., Ltd, Aichi-Ken (JP)

( * ) Notice: Subject to any disclaimer, the term of this patent is extended or adjusted under 35 U.S.C. 154(b) by 441 days.

(21) Appl. No.: 12/700,965

(22) Filed: Feb. 5, 2010

(65) Prior Publication Data
US 2010/0245575 A1    Sep. 30, 2010

(30) Foreign Application Priority Data

Mar. 27, 2009    (JP) ................................. 2009-080008

(51) Int. Cl.
*H04N 7/18*    (2006.01)
(52) U.S. Cl.
USPC .......................................................... 348/148
(58) Field of Classification Search
USPC ........ 340/900–936; 348/120–150; 701/36–50
See application file for complete search history.

(56) References Cited

U.S. PATENT DOCUMENTS

| | | | |
|---|---|---|---|
| 6,580,373 B1 * | 6/2003 | Ohashi | 340/901 |
| 7,246,050 B2 * | 7/2007 | Sheridan | 703/8 |
| 7,756,618 B2 * | 7/2010 | Mizusawa | 701/36 |
| 2001/0006554 A1 | 7/2001 | Kakinami | |
| 2005/0237385 A1 * | 10/2005 | Kosaka et al. | 348/42 |
| 2006/0209188 A1 * | 9/2006 | Mizusawa | 348/148 |
| 2008/0013790 A1 * | 1/2008 | Ihara et al. | 382/104 |
| 2008/0198229 A1 | 8/2008 | Hongo | |
| 2008/0309763 A1 | 12/2008 | Hongo | |
| 2009/0228204 A1 * | 9/2009 | Zavoli et al. | 701/208 |

FOREIGN PATENT DOCUMENTS

| | | | |
|---|---|---|---|
| CN | 1701213 A | 11/2005 |
| JP | 2003044996 A | 2/2003 |
| JP | 2005077107 A | 3/2005 |
| JP | 2008-205928 A | 9/2008 |

OTHER PUBLICATIONS

Search Report corresponding to EP 10 00 1227, dated May 8, 2012.
Office Action dated Oct. 10, 2013, corresponds to Chinese patent application No. 201010117713.8.

\* cited by examiner

*Primary Examiner* — Joseph Avellino
*Assistant Examiner* — Mark O Afolabi
(74) *Attorney, Agent, or Firm* — Lowe Hauptman & Ham, LLP

(57) ABSTRACT

In a driving support device and method, images of a vicinity of a vehicle are captured and recorded. Movement information relating to movement of the vehicle is acquired and a movement status of the vehicle based on the acquired movement information is determined. Based on (i) the determined movement status and (ii) a parameter associated with the determined movement status, the recorded image data is composited to create a composite image of an area including a position of the vehicle. The composite image is displayed on a display unit. The parameter is calibrated based on (a) a position of a reference marker included in the composite image created according to the movement status and (b) a predicted position of the reference marker superimposed and displayed on the composite image according to the movement status.

20 Claims, 10 Drawing Sheets

(a)

(b)

DRIVING SUPPORT DEVICE, DRIVING SUPPORT METHOD, AND DRIVING SUPPORT PROGRAM

CROSS-REFERENCE TO RELATED APPLICATION(S)

The disclosure of Japanese Patent Application No. 2009-080008 filed on Mar. 27, 2009, including the specification, claims, drawings and abstract thereof, is incorporated herein by reference in its entirety.

BACKGROUND

1. Technical Field

The present disclosure relates to a driving support device, a driving support method, and a driving support program.

2. Related Art

A driving support device that displays an image of a vicinity of a vehicle on a display is known. The driving support device displays image data of the vicinity of the vehicle, which is imaged by a camera that is installed at an external side of the vehicle, on the display allocated in the vicinity of a driver seat.

In such driving support device, there are cases where the deviation occurs in the position and the angle of the image displayed on the display due to the deviation of the installed position and angle of the camera. For such cases, a driving support system to arrange the position and the angle of the image displayed on the display is also being proposed. For example, in order to realize adjustment of a bird's eye image with a relatively-simple operation, a driving support system disclosed in Japanese Patent Application Publication No. JP-A-2008-205928 displays the overhead image converted from the bird's eye image together with a guide to indicate extended lines from the right and left ends of the vehicle on a display device, and makes the user correct the deviation between the image after the overhead conversion and the guide.

The proposed device accumulates image data acquired from the camera in a memory and outputs a composite image created by compositing image data accumulated in the memory. This device, in creating the composite image by compositing the image data, refers to parameters corresponding to, for example, the installed position of the camera, movement characteristic of the vehicle, and the like. Therefore, if the installed position of the camera, the movement characteristic of the vehicle, or the like changes, distortion and/or deviation can occur because the parameters do not correspond to the condition after the change. However, if only the deviation in the image and the guide in the overhead image can be corrected, and the parameters used in creating the composite image cannot be corrected to appropriate values.

There is a need for a driving support device, a driving support method, and a driving support program that can display a precise composite image by compositing image data recorded in a recording unit even when the installed position of the camera and/or the movement characteristic of the vehicle have changed.

SUMMARY

In an aspect, a driving support device comprises: an imaging unit for capturing images of a vicinity of a vehicle; a recording unit for recording image data of the images captured by the imaging unit; a movement status determining unit for acquiring movement information relating to movement of the vehicle and determining a movement status of the vehicle based on the acquired movement information; a composite image creating unit for, based on (i) the movement status determined by the movement status determining unit and (ii) a parameter associated with the movement status, compositing the image data recorded in the recording unit and creating a composite image of an area including a position of the vehicle; a displaying unit for displaying the composite image created by the composite image creating unit; and a calibrating unit for calibrating the parameter based on (a) a position of a reference marker included in the composite image that the composite image creating unit created according to the movement status and (b) a predicted position of the reference marker superimposed and displayed on the composite image according to the movement status.

In a further aspect a driving support method comprises the steps of capturing, by an imaging unit, images of a vicinity of a vehicle; recording, in a recording unit, image data of the captured images; acquiring movement information relating to movement of the vehicle and determining a movement status of the vehicle based on the acquired movement information; based on (i) the determined movement status and (ii) a parameter associated with the determined movement status, compositing the image data recorded in the recording unit and creating a composite image of an area including a position of the vehicle; displaying, on a display unit, the composite image; and calibrating the parameter based on (a) a position of a reference marker included in the composite image created according to the movement status and (b) a predicted position of the reference marker superimposed and displayed on the composite image according to the movement status.

BRIEF DESCRIPTION OF THE DRAWINGS

FIG. 5A is a plan view showing the positions of the vehicle and a reference marker. FIG. 5B shows a screens on a display.

FIGS. 7A, 7C, and 7E are plan views showing the positions of the vehicle and the reference marker. FIGS. 7B, 7D, and 7F show the corresponding screen on the display.

FIGS. 9A, 9C, and 9E are plan views showing the positions of the vehicle and the reference marker. FIGS. 9B, 9D, and 9F show the corresponding screen on the display.

FIG. 10A shows a screen before a change of the turn parameter. FIG. 10B shows the screen after the change of the turn parameter.

DETAILED DESCRIPTION

One or more embodiments will be described in further detail below in conjunction with the accompanying drawings. However, the scope of the present invention is not limited to the specifically described or illustrated embodiment(s).

Configuration

Figure 1:
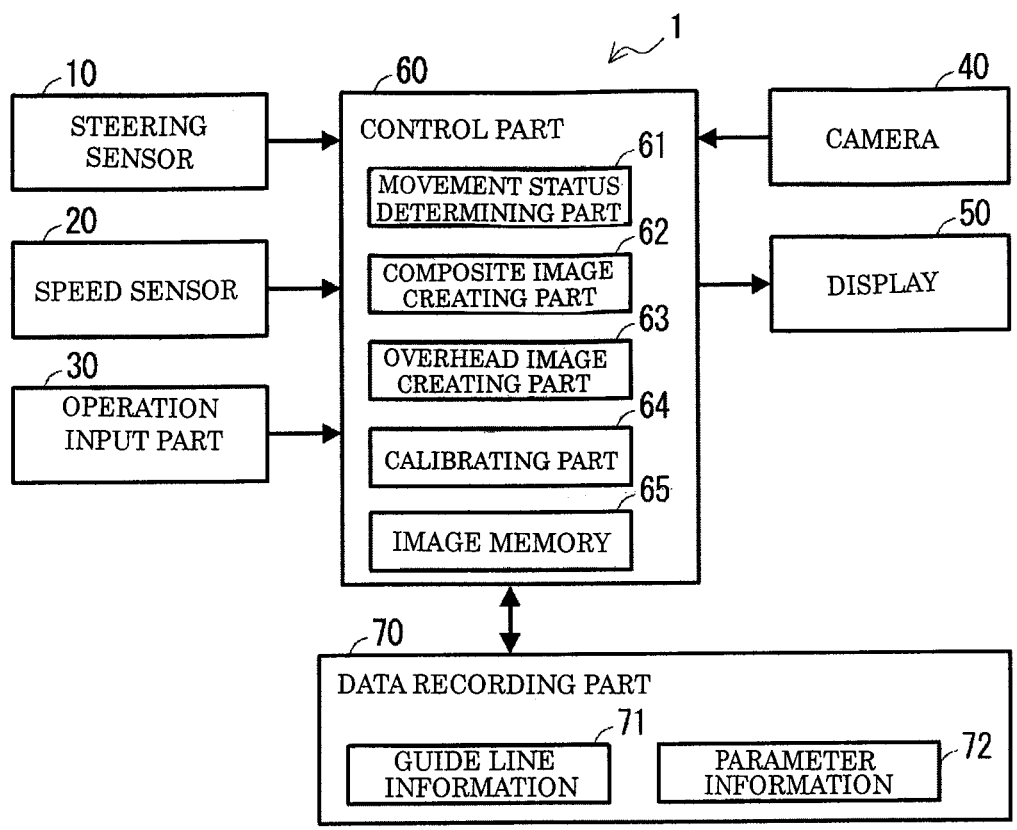
FIG. 1 is a block diagram illustrating a driving support device according to an embodiment.

First, the configuration of a driving support device 1 in accordance with an embodiment is described. FIG. 1 is a block diagram illustrating the driving support device 1. As shown in FIG. 1, a driving support device 1 includes a steering sensor 10, a speed sensor 20, an operation input part 30, a camera 40, a display 50, a control part 60, and a data recording part 70.

Configuration-Steering Sensor

The steering sensor 10 detects a steering angle of a steering wheel of a vehicle and outputs the detected value to the control part 60. As the steering sensor 10, a generally-known steering sensor can be utilized.

Configuration-Speed Sensor

The speed sensor 20 outputs a speed pulse signal proportional to the number of rotations of an axle and the like to the control part 60. As the speed sensor 20, a generally-known speed sensor can be utilized.

Configuration-Operation Input Part

The operation input part 30 receives an operation input by an operator. As the operation input part 30, a generally-known input unit such as a switch or a touch panel can be utilized.

Configuration-Camera

The camera 40 is an imaging unit that images a vicinity of the vehicle. As the camera 40, one or a plurality of units is installed for example in the vicinity of front and rear bumpers of the vehicle, and images the vicinity of the vehicle. Image data imaged by the camera 40 is inputted to the control part 60. The camera 40 can have any specific configuration. For example, a generally-known imaging device such as a CMOS image sensor, a CCD image sensor, and a generally-known optical part such as a fish-eye lens or a prism are utilized.

Configuration-Display

The display 50 is a displaying unit that displays a composite image and an overhead image created by the control part 60. The display 50 can have any specific configuration. A flat panel display such as a generally-known liquid crystal display or an organic EL display can be utilized.

Configuration-Control Part

The control part 60 is a controlling unit that controls the driving support device 1. Specifically, the control part 60 is a computer that includes a CPU, various programs that are interpreted and executed in the CPU (including OS and other basic control programs, and application programs that are activated in the OS to carry out specific functions), and an internal memory such as a RAM for storing the programs and various data. In particular, a driving support program according to one or more embodiments is installed in a memory or computer-readable storage medium of the driving support device 1 through any storage medium or network, and configures, when executed, various parts of the control part 60 in substance.

The control part 60 includes a movement status determining part 61, a composite image creating part 62, an overhead image creating part 63, a calibrating part 64, and an image memory 65 in terms of functional concept. The movement status determining part 61 is a movement status determining unit that acquires movement information relating to movement of the vehicle and determines movement status of the vehicle based on the acquired movement information. The "movement information" here includes the detected value of the steering angle inputted from the steering sensor 10 and the speed pulse signal inputted from the speed sensor 20. The "movement status" represents status relating to the movement of the vehicle such as a turn angle and a movement distance of the vehicle, for example. The composite image creating part 62 is a composite image creating unit that, based on the movement status determined by the movement status determining part 61, composites image data recorded in the data recording part 70 and creates a composite image of an area including a position of the vehicle. The overhead image creating part 63 is an overhead image creating unit that creates an overhead image of the area including the position of the vehicle based on the image data of the vicinity of the vehicle imaged by the camera 40. The calibrating part 64 is a calibrating unit that calibrates a parameter used when the movement status determining part 61 determines the movement status based on the movement information and an overhead parameter used when the overhead image creating part 63 creates the overhead image. The image memory 65 is a recording unit that records the image data of the vicinity of the vehicle imaged by the camera 40. In addition, the image memory 65 also records the composite image created by the composite image creating part 62 and the overhead image created by the overhead image creating part 63. The processing that is executed by these functional elements of the control part 60 will be described in detail later.

Configuration-Data Recording Part

The data recording part 70 is a recording unit that records the programs and the various data necessary for operation of the driving support device 1, and configured with for example a hard disk (not shown) as an external storage device. However, any other storage media, including a magnetic storage medium such as a magnetic disk or an optical storage medium such as a DVD or Blu-ray disk, can be used in place of or in combination with the hard disk.

The data recording part 70 records guide line information 71 and parameter information 72. The guide line information 71 is information for determining a position of a guide line superimposed and displayed on the composite image, and can be configured with for example bitmap data of the guide line on the composite image. Content of the guide line will be specifically described later. The parameter information 72 is information for determining various parameters used in the course of creation of the composite image and the overhead image, and includes, for example, a turn parameter used when the movement status determining part 61 determines a turn of the vehicle based on the detected value of the steering angle inputted from the steering sensor 10, an distance parameter used when the movement status determining part 61 determines the movement distance of the vehicle based on the speed pulse signal inputted from the speed sensor 20, an overhead parameter used when the overhead image creating part 63 creates the overhead image, and the like. As the turn parameter, a parameter for acquiring a turning radius of the vehicle corresponding to the steering angle or the turn angle of the vehicle corresponding to the steering angle and the movement distance can be utilized for example. As the distance parameter, a distance that the vehicle moves per output 1 pulse of the speed pulse signal (a speed pulse length) can be utilized for example. In addition, as the overhead parameter, various parameters for converting with respect to a coordinate or correcting with respect to a distortion the image data of the vicinity of the vehicle imaged by the camera 40 to the overhead image, such as a coordinate value that determines a installed position of the camera 40 for a forward/backward direction, a right/left direction, and a height direction, or a installed angle of the camera 40 for the respective axes of a roll axis, a pitch axis, and a yaw axis, are utilized.

Processing

Next, the processing executed by the driving support device 1 having such configuration is described. The processing executed by the driving support device 1 is roughly divided into composite image creation processing and calibration processing.

Processing-Composite Image Creation Processing

Figure 2:
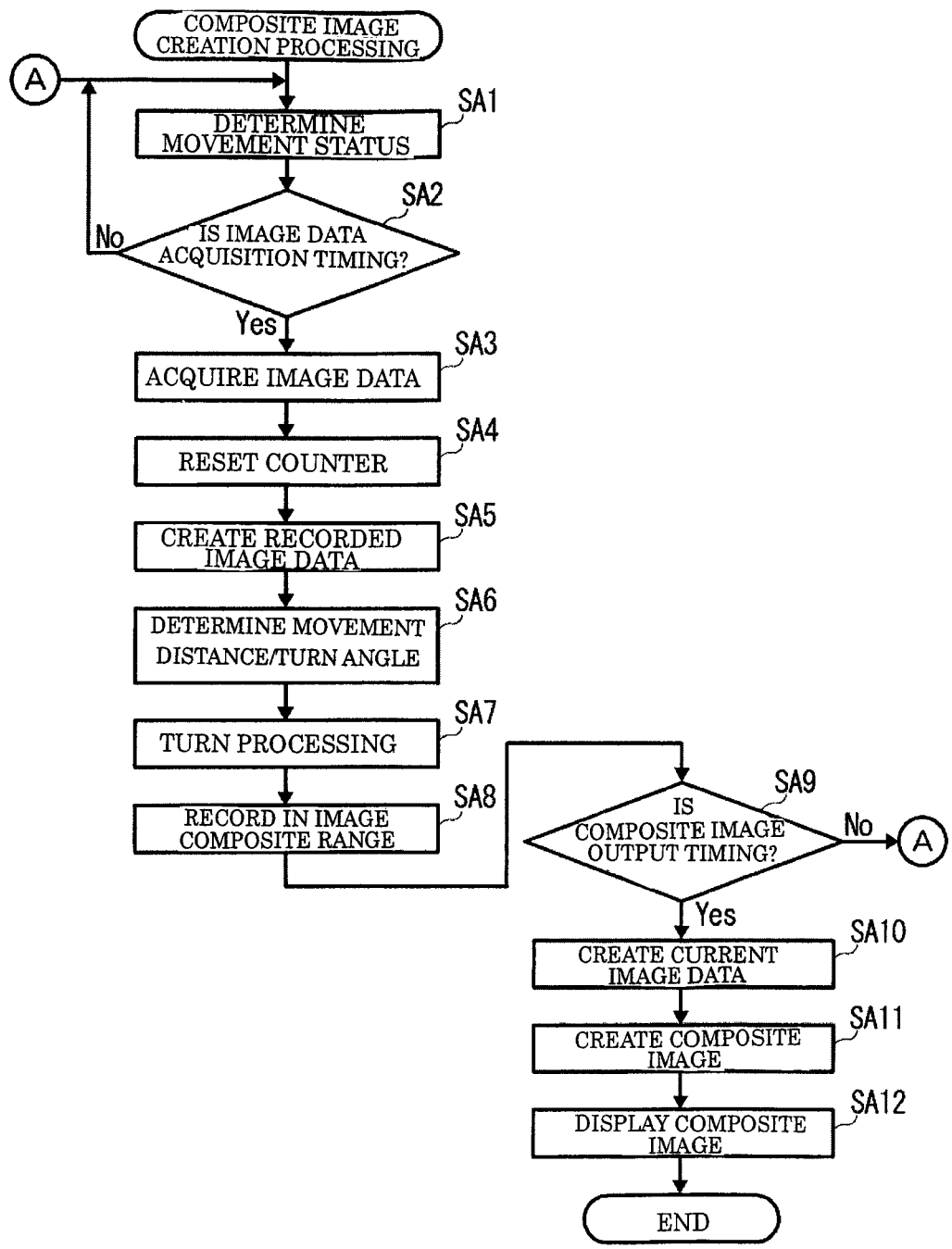
FIG. 2 is a flow chart of composite image creation processing.

First, the composite image creation processing is described. FIG. 2 is a flow chart of the composite image creation processing. (Hereinafter, a step is referred to as "S" in the description of each processing.) The composite image creation processing is activated, for example, when an instruction for activating the composite image creation processing has been inputted through the operation input part 30, or when the vehicle has been put into reverse gear and started to move backward.

As shown in FIG. 2, when the composite image creation processing has been activated, the movement status determining part 61 acquires the movement information such as the detected value of the steering angle inputted from the steering sensor 10, the speed pulse signal inputted from the speed sensor 20, and the like, and determines, based on the acquired movement information, the movement status such as the movement distance and the turn angle of the vehicle using the distance parameter and the turn parameter recorded in the data recording part 70 (SA1).

Next, the composite image creating part 62 determines whether or not a timing to acquire the image data has been arrived based on the movement distance determined at SA1 (SA2). For example, the number of input pulses of the speed pulse signal is accumulated in a pulse counter stored in a RAM, when the accumulated number of pulses reaches a predetermined number, in other words, when it is supposed that the vehicle has moved by a predetermined distance, it is determined that the timing to acquire the image data has been arrived.

As the result, if it is determined that the timing to acquire the image data has not been arrived (SA2: NO), the determination at SA2 is repeated. If it is determined that the timing to acquire the image data has been arrived (SA2: YES), the composite image creating part 62 acquires the image data imaged by the camera 40 (SA3). Then, the composite image creating part 62 resets a counter value of the pulse counter stored in the RAM and sets back to an initial value (SA4). Further, the overhead image creating part 63 performs an overhead conversion of the image data acquired by the composite image creating part 62 at SA3 to create recorded image data (SA5).

In addition, the composite image creating part 62 determines the movement distance and the turn angle of the vehicle from a reference position (for example, a position of the vehicle when the composite image creation processing has been activated) based on the movement status such as the movement distance, the turn angle, and the like determined at SA1 (SA6). Based on the determined turn angle, the recorded image data created at SA5 is rotated in a generally-known image processing method (SA7). After that, based on the movement distance and the turn angle determined at SA6, the rotated recorded image data is recorded in a corresponding pixel region within an image composite region in the image memory 65 (SA8). If such pixel region is overlapped with the pixel region of the recorded image data created in previous times, the overlapped region is overwritten with the recorded image data imaged later.

Next, the composite image creating part 62 determines whether or not timing to output the composite image has been arrived (SA9). For example, if more than a predetermined number of recorded image data was recorded in the image memory 65 since the previous composite image output, it is determined that the timing to output the composite image has been arrived.

As the result of the determination, if it is determined that the timing to output the composite image has not been arrived (SA9: NO), the procedure returns to SA1 and the movement status determining part 61 performs determination of the movement status (SA1). On the other hand, if it is determined that the timing to output the composite image has been arrived (SA9: YES), the overhead image creating part 63 acquires the image data imaged by the camera 40 at such moment and performs the overhead conversion of such image data to create current image data (SA10).

Subsequently, the composite image creating part 62 creates the composite image using the current image data created at SA10 and the recorded image data recorded in the image memory 65 (SA11). For example, the composite image creating part 62 extracts image data of a pixel region corresponding to an area including the current position of the vehicle from the respective recorded image data recorded in the image composite region of the image memory 65 and combines such extracted recorded image data with the current image data so as to be continuous by the same processing as each of SA6 to SA8 to create the composite image. When the image data has been created, the composite image creating part 62 displays the composite image on the display 50 (SA12). Thereafter, the processing of SA1 to SA12 is repeated. When a termination trigger has been inputted (for example, when an instruction for terminating the composite image creation processing has been inputted through the operation input part 30, or when the vehicle has been put into a gear other than the reverse gear), the composite image creation processing is terminated.

Processing-Calibration Processing

Figure 3:
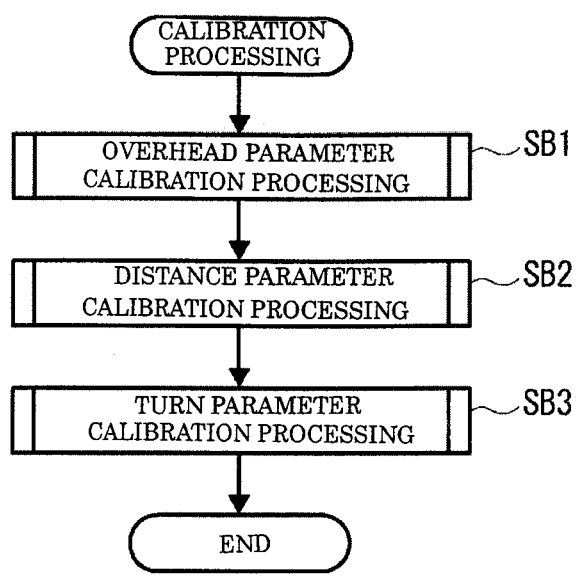
FIG. 3 is a flow chart of calibration processing.

Next, calibration processing is described. FIG. 3 is a flow chart of the calibration processing. The calibration processing is activated for example when an operation input for starting the calibration processing has been received through the operation input part 30.

As shown in FIG. 3, when the calibration processing is activated, the calibrating part 64 firstly executes overhead parameter calibration processing to calibrate the overhead parameter (SB1), secondly executes distance parameter calibration processing to calibrate the distance parameter (SBA and finally executes turn parameter calibration processing to calibrate the turn parameter (SB3). Hereinafter, contents of the respective subroutines of SB1 to SB3 are described.

Processing-Overhead Parameter Calibration Processing

Figure 4:
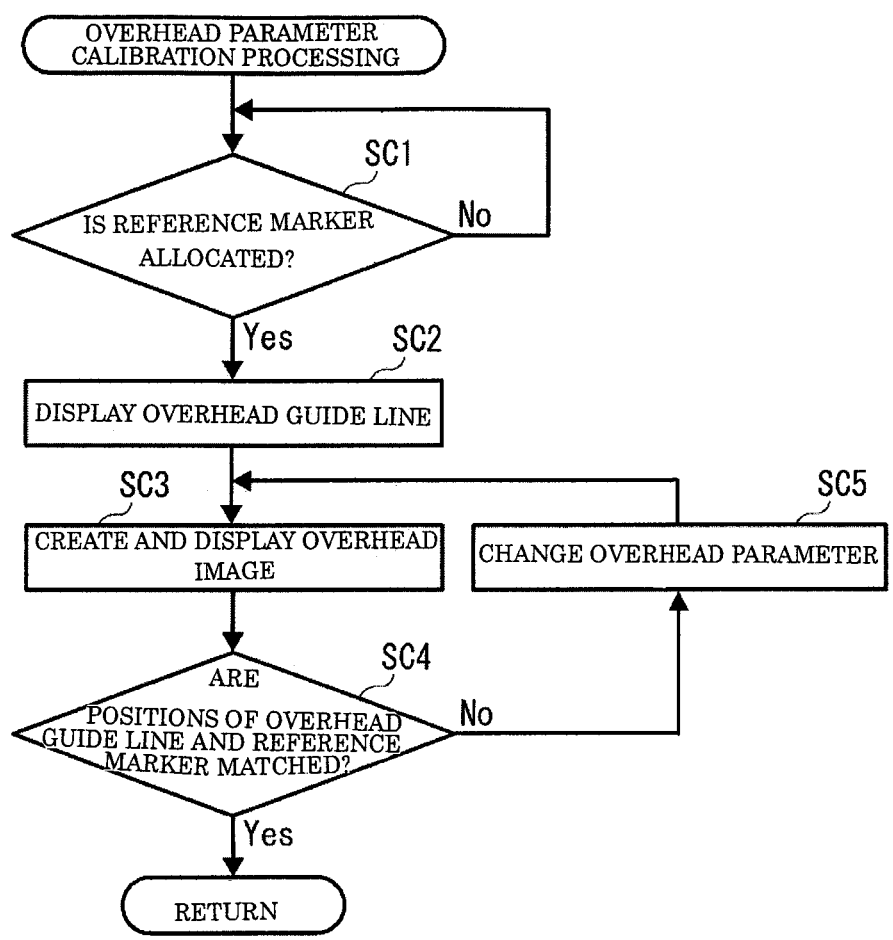
FIG. 4 is a flow chart of overhead parameter calibration processing.
Figure 5:
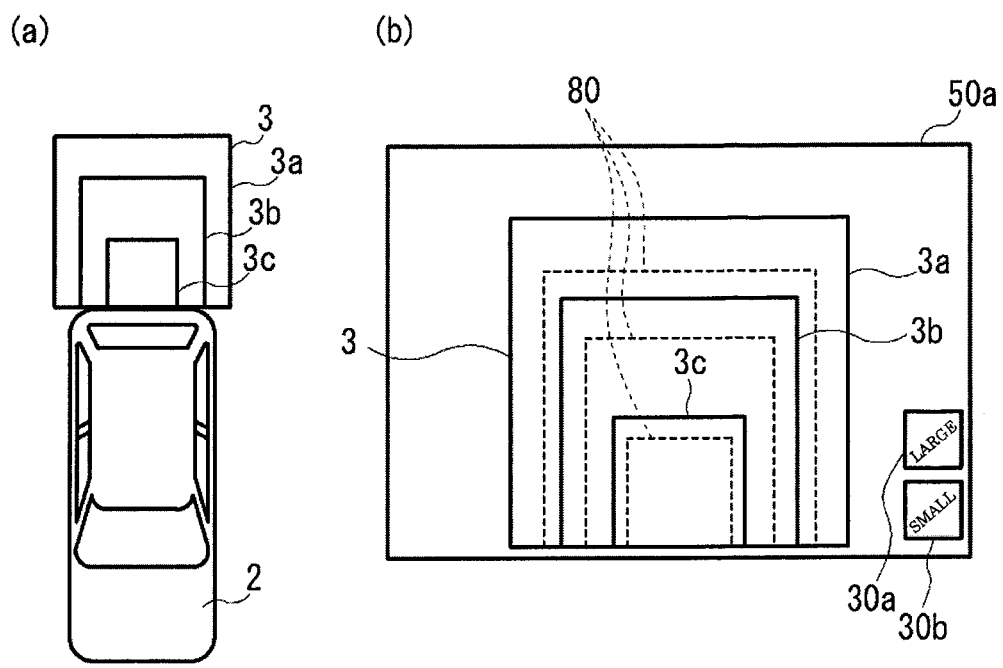
FIGS. 5A and 5B show a vehicle and a display at the time of execution of the overhead parameter calibration processing.

First, the overhead parameter calibration processing at SB1 is described. FIG. 4 is a flow chart of the overhead parameter calibration processing. FIGS. 5A and 5B show the vehicle and the display 50 at the time of execution of the overhead parameter calibration processing. FIG. 5A is a plan view showing the positions of the vehicle and a reference marker. FIG. 5B shows a screen 50*a* of the display 50.

When the overhead parameter calibration processing is activated at the above SB1, the calibrating part 64 determines whether or not a reference marker 3 has been allocated on a road surface of an area that the camera 40 can image (SC1). Here, the reference marker 3 is a marker that serves as a reference when calibrating a parameter, and can be configured with frame borders of a plurality of rectangles that overlap in one side, as shown in FIG. 5A. In the description below, a first fame border 3a represents an external frame border in the reference marker 3, the second frame border 3b represents an intermediate frame border, and the third frame border 3c represents an internal frame border. In addition, a "right-left frame border" represents a frame border parallel to the side on which the respective frame borders overlap each other, and a "forward-backward frame border" represents a frame border perpendicular to the right-left frame border.

In an example shown in FIG. 5A, at the time of a start of the overhead parameter calibration processing, the reference marker 3 is allocated on the road surface or a vehicle 2 is moved so that the forward-backward frame border is parallel to a travel direction of the vehicle 2 and the side on which the respective frame borders of the reference marker 3 overlap each other matches a rear line of the vehicle 2 when viewing from a direction perpendicular above the vehicle 2. If the reference marker 3 is allocated in such manner and the operation input indicating that the allocation of the reference marker 3 was completed has been received through the operation input part 30 for example, it can be determined that the reference marker 3 was allocated on the road surface of the area that the camera 40 can image.

Back in FIG. 4, if it is determined that the reference marker 3 was allocated on the road surface of the area that the camera 40 can image (SC1: YES), the calibrating part 64 displays an overhead guide line on the display 50 based on the guide line information 71 stored in the data recording part 70 (SC 2). The overhead guide line indicates a predicted position of the reference marker 3 in the overhead image according to an overhead conversion, and serves as a reference when calibrating the overhead parameter based on the overhead image displayed on the display 50. For example, as shown in dashed line in FIG. 5B, an overhead guide line 80 is displayed as a frame border that indicates a position and a shape, in which manner the reference marker 3 should be displayed in the overhead image if the overhead parameter is correct. For example, the overhead guide line 80 is superimposed and displayed as a bitmap image corresponding to the shape of the reference marker 3 over the overhead image on the display 50. In this case, the bitmap image of the overhead guide line 80, of which the position and the shape are determined for example using coordinate data in a coordinate system having an upper-left corner of the screen 50a as an origin, is displayed fixedly on the screen 50a.

Back in FIG. 4, the overhead image creating part 63 creates the overhead image of the area including the position of the vehicle 2 based on the image data of the vicinity of the vehicle 2 imaged by the camera 40 and the overhead parameter, and displays the overhead image on the display 50 superimposing the overhead guide line 80 displayed at SC2 (SC3). For example, the overhead image creating part 63 refers to the overhead parameter recorded in the data recording part 70 and performs a coordinate conversion toward the image data inputted from the camera 40 to perform the overhead conversion toward such image data, and displays the converted image data on the display 50. For example, the overhead image creating part 63 performs the overhead conversion toward the image data, which was acquired by imaging from an obliquely upward direction the road surface where the reference marker 3 is allocated, and displays on the display 50 the converted image data as a plan view as shown in solid line in FIG. 5B.

Back in FIG. 4, the calibrating part 64 determines whether or not the position of the reference marker 3 included in the overhead image that the overhead image creating part 63 created and displayed on the display 50 at SC3 matches the position of the overhead guide line 80 superimposed and displayed on the overhead image (SC4). If an input indicating that the position of the reference marker 3 included in the overhead image matches the position of the overhead guide line 80 has been performed for example by pressing an enter button (not shown) as the operation input part 30, the calibrating part 64 determines that the position of the reference marker 3 included in the overhead image matches the position of the overhead guide line 80. On the other hand, as shown in FIG. 5B for example, if a "large" button 30a or a "small" button 30b displayed as operation input buttons for changing the overhead parameter on the display 50 serving as a touch panel has been pressed, it is assumed that a change of the overhead parameter is necessary and the calibrating part 64 determines that the position of the reference marker 3 included in the overhead image does not match the position of the overhead guide line 80.

Back in FIG. 4, if it is determined that the position of the reference marker 3 included in the overhead image does not match the position of the overhead guide line 80 (SC4: NO), the calibrating part 64 changes a value of the overhead parameter recorded in the data recording part 70 for example based on the operation input through the operation input part 30 (SC5). For example, a button as the operation input part 30 is previously associated with a change volume of the overhead parameter to be changed if such button has been pressed, and based on the pressed button and the time of pressings, the change of the overhead parameter is performed by the corresponding change volume. In the example of FIG. 5B, if the "large" button 30a has been operated, the change of the overhead parameter is performed so that the overhead image is zoomed in (for example, a coordinate value to determine the installed position of the camera 40 is shifted to a coordinate value indicating a position higher than the position indicated by the current coordinate value, or a position anterior in relation to the vehicle 2). If the "small" button 30b has been operated, the change of the overhead parameter is performed so that the overhead image is zoomed out (for example, a coordinate value to determine the installed position of the camera 40 is shifted to a coordinate value indicating a position lower than the position indicated by the current coordinate value, or a position posterior in relation to the vehicle 2). Back in FIG. 4, the overhead image creating part 63 creates the overhead image using the overhead parameter after the change and displays the overhead image on the display 50 superimposing the overhead guide line 80 displayed at SC2 (SC3).

On the other hand, if it is determined that the position of the reference marker 3 included in the overhead image matches the position of the overhead guide line 80 (SC4: YES), it is assumed that the overhead image creating part 63 correctly performs the overhead conversion of the image data to create the overhead image and the calibrating part 64 terminates the overhead parameter calibration processing.

Processing-Distance Parameter Calibration Processing

Figure 6:
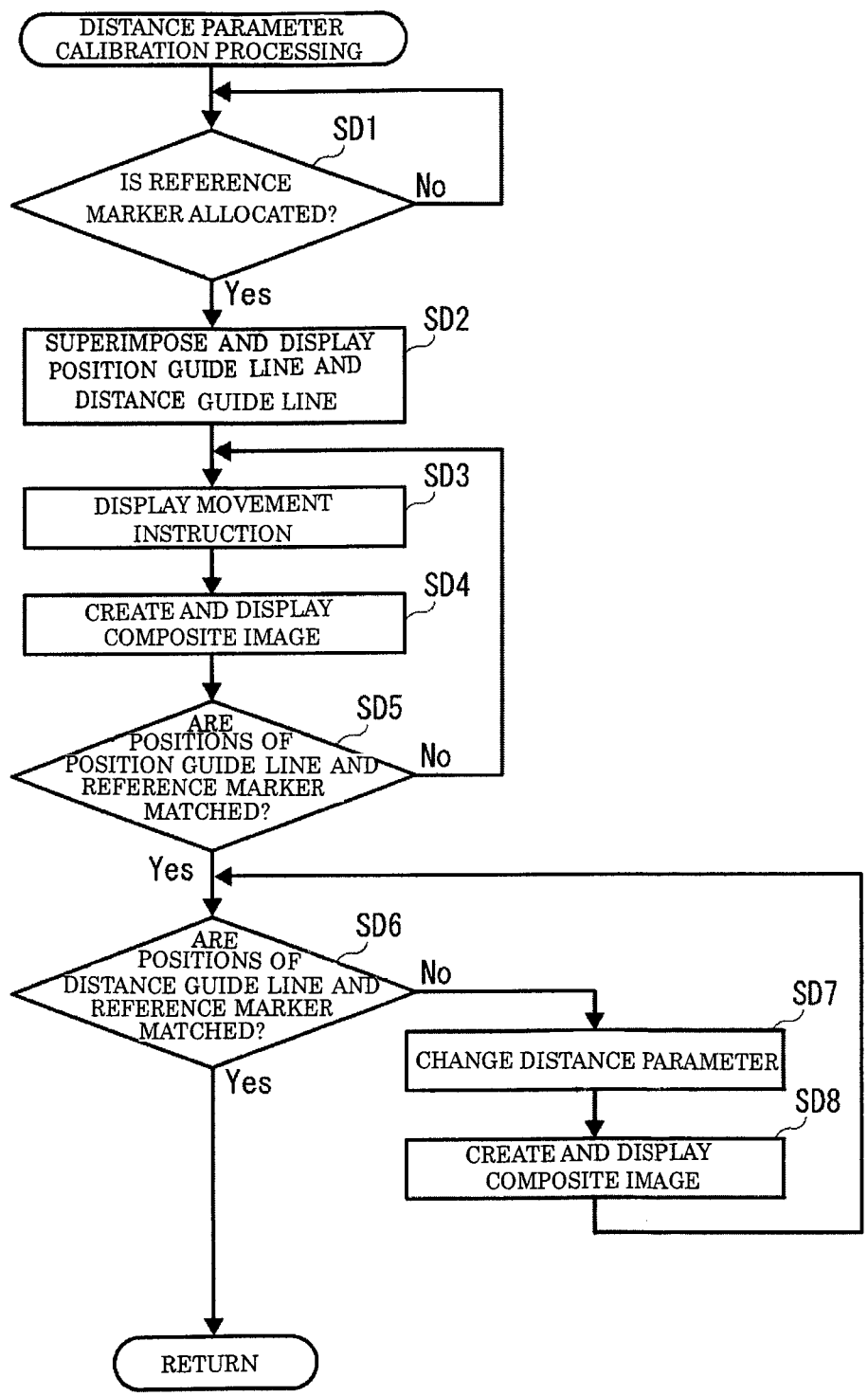
FIG. 6 is a flow chart of distance parameter calibration processing.
Figure 7:
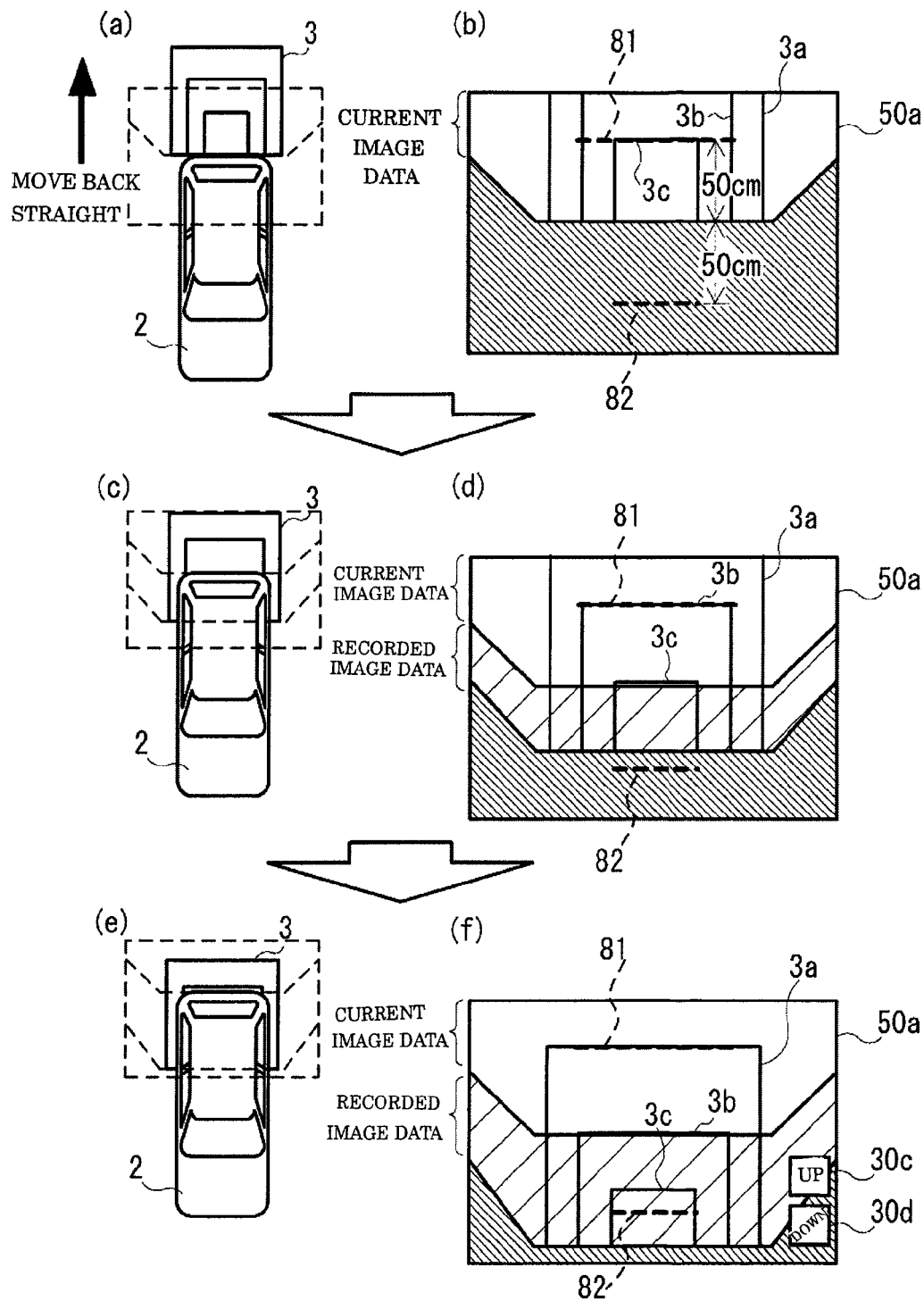
FIGS. 7A, 7B, 7C, 7D, 7E, and 7F show the vehicle and the display at the time of execution of the distance parameter calibration processing.

Next, the distance parameter calibration processing at SB2 in FIG. 3 is described. FIG. 6 is a flow chart of the distance parameter calibration processing. In addition, FIGS. 7A to 7F show the vehicle 2 and the display 50 at the time of execution of the distance parameter calibration processing. FIGS. 7A, 7C, and 7E are plan views showing the positions of the vehicle 2 and the reference marker 3. FIGS. 7B, 7D, and 7F show the corresponding screen 50a on the display 50. In FIGS. 7B, 7D, and 7F, the densely-hatched area within the hatched area indicates the area where no image is displayed because there is no corresponding image data. In addition, the thinly-hatched area indicates the area composited based on the recorded image data recorded in the composite image region of the image memory 65.

Here, as the condition at the time of a start of the overhead parameter calibration processing, the distance parameter calibration processing is executed on the assumption that the reference marker 3 is allocated or the vehicle 2 is moved so that the forward-backward frame border of the reference marker 3 is parallel to the travel direction of the vehicle 2 and the side on which the respective frame borders of the reference marker 3 overlap each other matches a rear line of the vehicle 2 when viewing from a direction perpendicular above the vehicle 2 (refer to FIG. 7A). The reference marker 3 is configured by combining a plurality of lines with a predetermined length by a predetermined angle each other. In the description below, the reference marker 3 includes for example the first frame border 3a that is a square 1 m 50 cm on a side, the second frame border 3b that is a square 1 m on a side, and the third frame border 3c that is a square 50$cm$ on a side. In addition, the image of a fixed area having the vehicle 2 as a reference is displayed on the display 50. The area corresponding to the image is indicated in dashed line in FIGS. 7A, 7C, and 7E.

When the distance parameter calibration processing is activated at SB2 described above, as shown in FIG. 6, the calibrating part 64 determines whether or not the reference marker 3 has been allocated on the road surface of the area that the camera 40 can image (SD1). For example, if the reference marker 3 is allocated as illustrated in FIG. 7A and the operation input indicating that the allocation of the reference marker 3 was completed has been received through the operation input part 30, it can be determined that the reference marker 3 has been allocated on the road surface of the area that the camera 40 can image. In this case, as shown in FIG. 7B, the overhead image created based on the actual image data imaged by the camera 40 is displayed as the current image data on the screen 50a. When the allocation of the reference marker 3 was completed, the reference marker 3 is displayed so that the side on which the respective frame borders overlap each other is positioned at the lower part of the current image data (a border between the non-hatched area and the hatched area in FIG. 7B).

Back in FIG. 6, if it is determined that the reference marker 3 has been allocated on the road surface of the area that the camera 40 can image (SD1: YES), the calibrating part 64 displays on the display 50 a position guide line and a distance guide line based on the guide line information 71 stored in the data recording part 70 (SD 2). The position guide line is a position marker as a reference to determine the position to stop when the vehicle 2 has moved straight, and displayed by a straight line perpendicular to the travel direction of the vehicle 2 on the screen 50a. In the present embodiment, as shown in FIGS. 7A to 7F, in a part created based on the actual image data imaged by the camera 40 (the part indicated as the "current image data" in FIG. 7B) within the composite image created by the composite image creating part 62, a position guide line 81 is fixedly displayed at a position of the right-left frame border of the third frame border 3c of the reference marker 3 (the dotted line on the upper side in FIG. 7B) in a condition before the vehicle 2 starts a straight backward movement (FIG. 7B). In this case, as the length of the forward-backward frame border of the third frame border 3c is 50$cm$, the position guide line 81 is fixedly displayed as the bitmap image indicating a straight line in a direction perpendicular to the travel direction of the vehicle 2 at a position corresponding to a distance of 50 cm from the lower part of the current image data in the composite image. In this case, when the vehicle 2 completes the straight backward movement of 1 m from the condition of FIG. 7B, the position guide line 81 is matched with the right-left frame border of the first frame border 3a that is 1m from the right-left frame guide line of the third frame border 3c of the reference marker 3. The position guide line 81 is displayed in a part of the current image data; therefore, whenever the vehicle 2 completes a 1m straight backward movement, the position guide line 81 becomes matched with the right-left frame border of the first frame border 3a. The bitmap image of the position guide line 81, of which the position and the shape are determined for example using the coordinate data in the coordinate system having the upper-left corner of the screen 50a as an origin, is fixedly displayed on the screen 50a.

In addition, the distance guide line indicates a predicted position of the reference marker 3 in the composite image according to a straight movement, and serves as a reference when calibrating the distance parameter based on the composite image displayed on the display 50. For example, as shown in FIGS. 7A to 7F, a distance guide line 82 is fixedly displayed (the dotted line on the lower side in FIG. 7B) at a part created based on the recorded image data imaged in the past within the composite image (a part where the "current image data" is not displayed in FIG. 7B) as a line indicating a position at which the right-left frame border of the third frame border 3c of the reference marker 3 in the overhead image should be displayed on the display 50 if the distance parameter is correct, when the vehicle 2 has moved straight by a predetermined distance (in the present embodiment, 1m that corresponds to a distance from the right-left frame border of the third frame border 3c to the right-left frame border of the first frame border 3a of the reference marker 3). In the present embodiment, the predicted position of the right-left frame border of the third frame border 3c of the reference marker 3 of when the vehicle 2 moves by the distance of 1m that is from the position at which the position guide line 81 matches the right-left frame border of the third frame border 3c of the reference marker 3 as shown in FIG. 7B to the position at which the position guide line 81 matches the right-left frame border of the first frame border 3a as shown in FIG. 7F, is displayed as the distance guide line 82. In this case, the distance guide line 82 is fixedly displayed as the bitmap image indicating a straight line in the direction perpendicular to the travel direction of the vehicle 2 at the position corresponding to the distance of 1 m from the right-left frame border of the third frame border 3c in the composite image in the condition of FIG.7B, that is, the position corresponding to the distance of 50 cm from a border between the current image data and the recorded image data. If the distance parameter is correct, when the vehicle 2 moves straight by 1 m from the condition of FIG. 7B, the movement distance of the third frame border 3c in the composite image becomes equal to the actual movement distance 1 m. Consequently, the distance guide line 82 matches the right-left frame border of the third frame border 3c displayed in the area of the recorded image data. On the other hand, if the distance parameter is not correct, the movement distance of the third frame border 3c in the composite image differs from the actual movement distance of 1 m. Consequently, the distance guide line 82 does not match the third frame border 3c displayed in the area of the recorded image data.

After the position guide line 81 and the distance guide line 82 were displayed on the display 50 at SD2, the calibrating part 64 displays an instruction for moving the vehicle 2 straight backward toward the reference marker 3 on the display 50 (SD3). For example, the right-left frame border of the first frame border 3a and the position guide line 81 are highlighted, and a message indicating to move the vehicle 2 straight backward is displayed till these are matched. Or, it may be possible to automatically move the vehicle 2 straight backward by letting the calibrating part 64 control a throttle.

According to the straight backward movement of the vehicle 2, the composite image creating part 62 executes the above-mentioned composite image creation processing to create the composite image of the area including the position of the vehicle 2 and displays the created composite image on the display 50 (SD4).

The calibrating part 64 determines whether or not the position of the position guide line 81 displayed at SD2 matches the position of the reference marker 3 included in the composite image. (SD5). For example, in FIGS. 7A to 7F, if the right-left frame border of the first frame border 3a of the reference marker 3 is used as a reference, in case of the condition of FIG. 7D, it is determined that the positions of such frame border and the position guide line 81 are not matched. On the other hand, in case of the condition of FIG. 7F, it is determined that the positions of such frame border and the position guide line 81 are matched. If an input indicating that the positions of the first frame border 3a of the reference marker 3 in the composite image and the position guide line 81 are matched is performed for example by pressing an enter button (not shown) as the operation input part 30, the calibrating part 64 determines that the position of the position guide line 81 matches the position of the reference marker 3 included in the composite image. On the other hand, if the vehicle 2 continues the straight backward movement, the calibrating part 64 determines that the position of the position guide line 81 does not match the position of the reference marker 3 included in the composite image.

Back in FIG. 6, if it is determined that the position of the position guide line 81 does not match the position of the reference marker 3 included in the composite image (SD5: NO), the composite image creating part 62 repeats a creation of the composite image and its display on the display 50 (SD4). On the other hand, if it is determined that the position of the position guide line 81 matches the position of the reference marker 3 included in the composite image (SD5: YES), it is considered that the vehicle 2 has moved straight by a predetermined distance (1 m in the example of FIGS. 7A to 7F) and the calibrating part 64 determines whether or not the position of the reference marker 3 included in the composite image that the composite image creating part 62 created according to the straight movement of the vehicle 2 matches the position of the distance guide line 82 superimposed and displayed on the composite image (SD6). If an input indicating that the positions of the third frame border 3c of the reference marker 3 in the composite image and the distance guide line 82 are matched is performed for example by pressing an enter button (not shown) as the operation input part 30, the calibrating part 64 determines that the position of the distance guide line 82 matches the position of the reference marker 3 included in the composite image. On the other hand, if an "up" button 30c or a "down" button 30d displayed as operation input buttons for changing the distance parameter on the display 50 serving as a touch panel has been pressed, it is assumed that a change of the distance parameter is necessary and the calibrating part 64 determines that the position of the distance guide line 82 does not match the position of the reference marker 3 included in the composite image.

For example, in FIGS. 7A to 7F, if the right-left frame border of the third frame border 3c of the reference marker 3 is used as a reference, in case of the condition of FIG. 7F, it is determined that the positions of such frame border and the distance guide line 82 are not matched. For example, if a radius of tires was enlarged due to a change of tires, the distance that the vehicle 2 actually moves per pulse of the speed pulse signal becomes longer than the distance to move per pulse of the speed pulse signal that is recorded as the distance parameter in the data recording part 70. For example, after the radius of tires was enlarged due to the change of tires in the vehicle 2, if the distahce that the vehicle 2 actually moves per pulse of the speed pulse signal is 10 cm whereas the distance to move per pulse of the speed pulse signal that is recorded in the data recording part 70 is 8 cm, when the vehicle 2 moves 1 m, the number of pulses of the speed pulse signal outputted from the speed sensor 20 is 1 m/10 cm=10 pulses. On the other hand, the distance to move per pulse of the speed pulse signal that is recorded as the distance parameter in the data recording part 70 is 8 cm; therefore, the movement distance of the vehicle 2 determined based on the distance parameter becomes 8 cm×10 pulses=80 cm, which is different from the actual movement distance of the vehicle 1 m. When the composite image is created based on the movement distance determined in such manner in the composite image creation processing, the composite image, in which the right-left frame border of the third frame border 3c does not reach the distance guide line 82, is created as shown in FIG. 7F.

Back in FIG. 6, if it is determined that the position of the reference marker 3 included in the composite image does not match the position of the distance guide line 82 (SD6: NO), the calibrating part 64 changes a value of the distance parameter recorded in the data recording part 70, for example, based on the operation input through the operation input part 30 (SD7). For example, as shown in FIG. 7F, the "up" button 30c and the "down" button 30d are displayed as operation input buttons for changing the distance parameter on the display 50 serving as a touch panel. If the "up" button 30c has been operated, the distance parameter is changed so that the reference marker 3 displayed in the part of the recorded image data within the composite image is moved upward on the screen 50a. That is, in order to reduce an interval of the recorded image data overlaid sequentially along with the movement of the vehicle 2 in the composite image creation processing, the distance to move per pulse of the speed pulse signal recorded as the distance parameter in the data recording part 70 is shifted to a value smaller than a current value. For example, each time the "up" button 30c is pressed once, the distance to move per pulse of the speed pulse signal is shortened by a predetermined length (for example 1 cm). On the other hand, if the "down" button 30d has been operated, the distance parameter is changed so that the reference marker 3 displayed in the part of the recorded image data within the composite image is moved downward on the screen 50a. That is, in order to increase the interval of the recorded image data overlaid sequentially along with the movement of the vehicle 2 in the composite image creation processing, the distance to move per pulse of the speed pulse signal recorded as the distance parameter in the data recording part 70 is shifted to a value larger than a current value. For example, each time the "down" button 30d is pressed once, the distance to move per pulse of the speed pulse signal is enlarged by a predetermined length (for example 1 cm).

Back in FIG. 6, the composite image creating part 62 executes the composite image creation processing using the distance parameter after the change and displays the created composite image on the display 50 superimposing the position guide line 81 and the distance guide line 82 displayed at SD2 (SD8). Then, it is determined that the position of the reference marker 3 included in the composite image matches the position of the distance guide line 82 again (SD6).

On the other hand, at SD6, if it is determined that the position of the reference marker 3 included in the composite image matches the position of the distance guide line 82 (SD6: YES), it is assumed that the composite image creating part 62 sequentially overlays the recorded image data in appropriate intervals to create the composite image in the composite image creation processing and the calibrating part 64 terminates the distance parameter calibration processing.

Processing-Turn Parameter Calibration Processing

Figure 8:
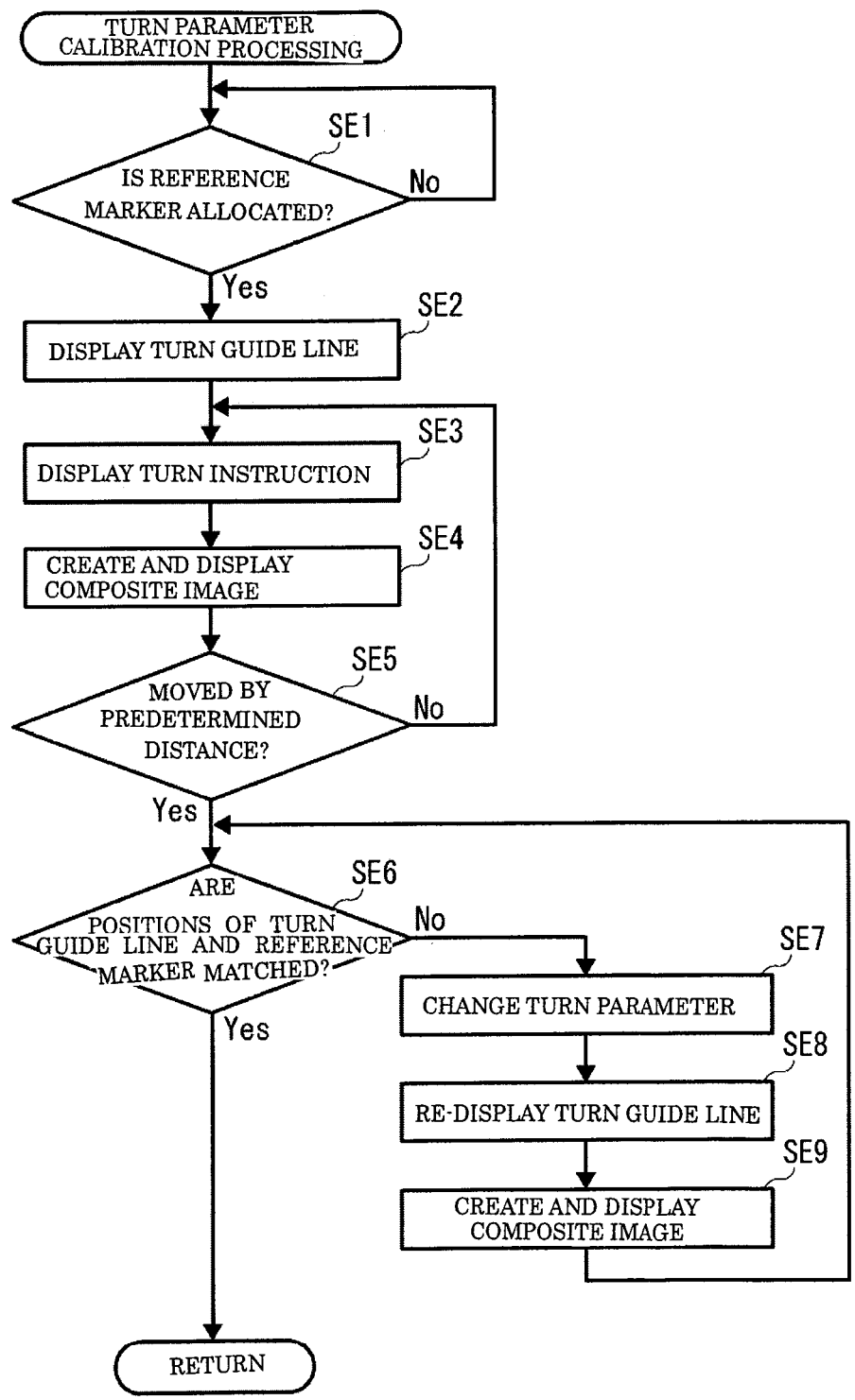
FIG. 8 is a flow chart of turn parameter calibration processing.
Figure 9:
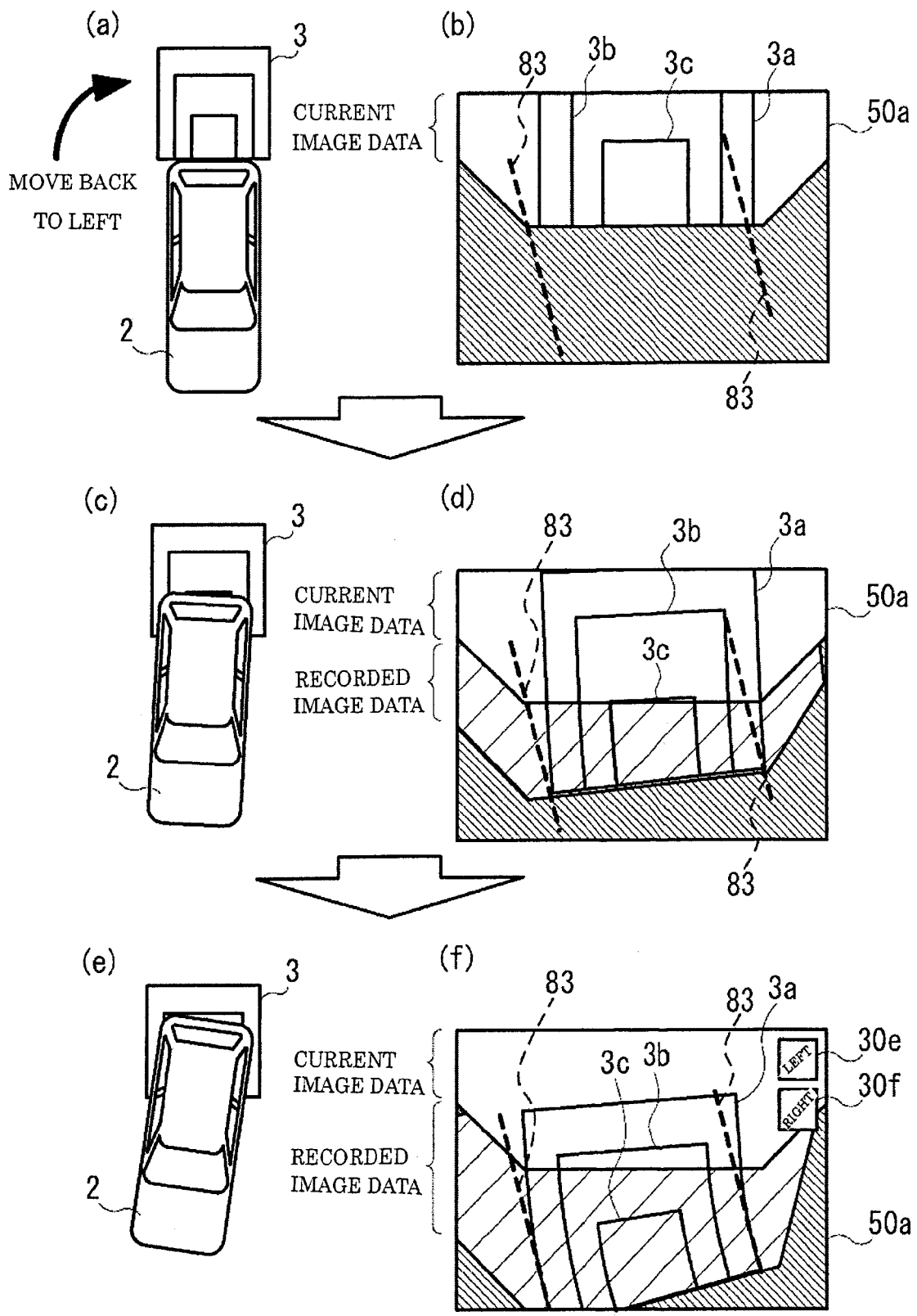
FIGS. 9A, 9B, 9C, 9D, 9E, and 9F show the vehicle and the display at the time of execution of the turn parameter calibration processing.

Next, the turn parameter calibration processing at SB3 in FIG. 3 is described. FIG. 8 is a flow chart of the turn parameter calibration processing. FIGS. 9A to 9F show the vehicle 2 and the display 50 at the time of execution of the turn parameter calibration processing. FIGS. 9A, 9C, and 9E are plan views showing the positions of the vehicle 2 and the reference marker 3. FIGS. 9B, 9D, and 9F show the screen 50a on the display 50. Here, as the condition at the time of a start of the overhead parameter calibration processing, the turn parameter calibration processing is executed on the assumption that the reference marker 3 is allocated in the vicinity of a rear side of the vehicle 2 so that the forward-backward frame border of the reference marker 3 is parallel to the travel direction of the vehicle 2 (refer to FIG. 9A).

When the turn parameter calibration processing is activated at SB3 described above, as shown in FIG.8, the calibrating part 64 determines whether or not the reference marker 3 has been allocated on the road surface of the area that the camera 40 can image (SE1). For example, if the reference marker 3 is allocated as illustrated in FIG. 9A and the operation input indicating that the allocation of the reference marker 3 was completed has been received through the operation input part 30, it can be determined that the reference marker 3 has been allocated on the road surface of the area that the camera 40 can image.

Back in FIG. 8, if it is determined that the reference marker 3 has been allocated on the road surface of the area that the camera 40 can image (SE1: YES), the calibrating part 64 displays a turn guide line on the display 50 based on the guide line information 71 stored in the data recording part 70 (SE 2). The turn guide line indicates a predicted position of the reference marker 3 in the composite image according to a turn, and serves as a reference when calibrating the turn parameter based on the composite image displayed on the display 50. In the present embodiment, the predicted position of the forward-backward frame border of the first frame border 3a of the reference marker 3 of when the vehicle 2 moves backward by a predetermined distance with a predefined steering angle from the condition, in which the reference marker 3 was positioned in the vicinity of the rear side of the vehicle 2, as shown in FIG. 9A, is determined using the turn parameter recorded in the data recording part 70 and displayed as the turn guide line 83.

After the turn guide line 83 was displayed on the display 50 at SE2, the calibrating part 64 displays an instruction for turning the vehicle 2 on the display 50 (SE3). For example, a message indicating to turn a steering wheel by a predetermined steering angle (for example, turn one rotation in a counterclockwise direction or the like) and a distance counter for moving the vehicle backward by a predetermined distance (for example, move backward 1m more, or the like) are displayed on the display 50. Or, it may be possible to automatically turn the vehicle 2 by letting the calibrating part 64 control a steering wheel and a throttle.

According to the turn of the vehicle 2, the composite image creating part 62 executes the above-mentioned composite image creation processing to create the composite image of the area including the position of the vehicle 2 and displays the created composite image on the display 50 (SE4).

The calibrating part 64 determines whether or not the vehicle 2 has moved backward by a predetermined distance (SE5). For example, based on the vehicle speed pulse signal inputted from the speed sensor 20 and the distance parameter calibrated in the distance parameter calibration processing, the movement status determining part 61 determines the movement distance of the vehicle 2 and determines whether or not the determined movement distance has reached a predetermined distance. As the result, if it is determined that the vehicle 2 has not moved backward by the predetermined distance (SE5: NO), the calibrating part 64 returns to SE3 and displays the instruction for turning the vehicle 2 on the display 50.

On the other hand, if it is determined that the vehicle 2 has moved by the predetermined distance (SE5: YES), the calibrating part 64 determines whether or not the position of the reference marker 3 included in the composite image that the composite image creating part 62 created according to the turn of the vehicle 2 matches the position of the turn guide line 83 superimposed and displayed on the composite image (SE6).

For example, in FIG. 9F showing the screen 50a of the display 50 of when the vehicle 2 has moved backward by the predetermined distance, it is determined that the positions of the forward-backward frame border of the first frame border 3a of the reference marker 3 and the turn guide line 83 as the predicted position thereof are not matched. For example, along with a change of a suspension, a change of a radius of tires/an offset due to the change of tires, or the like, there are cases where the actual turning radius corresponding to the steering angle on the vehicle 2 becomes larger than the turning radius recorded as the turn parameter in the data recording part 70. When the turning radius becomes large, the turn angle when the vehicle has moved by the predetermined distance becomes small. In this case, in the composite image creation processing, the angle between recorded image data, which is turned and overlaid sequentially according to the turn of the vehicle 2, becomes larger than the actual turn angle of the vehicle 2. Consequently, the forward-backward frame border of the third frame border 3c is curved, and the composite image, in which the position of forward-backward frame border of the third frame border 3c does not match the position of the turn guide line 83, is created as shown in FIG. 9F.

Figure 10:
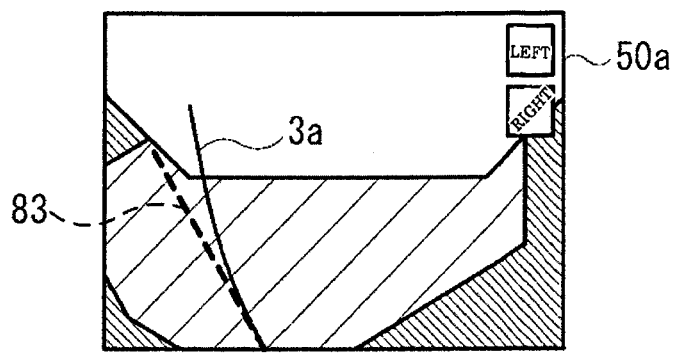
FIGS. 10A and 10B illustrates a screen displayed on the display when changing a value of a turn parameter.
Figure 10:
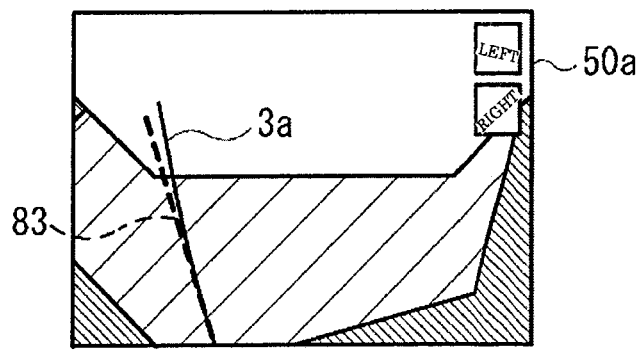

Back in FIG. 8, if it is determined that the position of the reference marker 3 included in the composite image does not match the position of the turn guide line 83 (SE6: NO), the calibrating part 64 changes a value of the turn parameter recorded in the data recording part 70, for example, based on the operation input through the operation input part 30 (SE7). FIGS. 10A and 10B illustrate the screen 50a displayed on the display 50 when changing the value of the turn parameter. FIG. 10A shows the screen 50a before a change of the turn parameter. FIG. 10B shows the screen 50a after the change of the turn parameter. To make FIGS. 10A and 10B simple, only one line is displayed for each of the forward-backward frame border of the first frame border 3a of the reference marker 3 and the turn guide line 83.

As shown in FIG. 9F, for example, a "left" button 30e and a "right" button 30f are displayed as operation input buttons for changing the turn parameter on the display 50 serving as a touch panel. If the "left" button 30e has been operated, the turn parameter is changed so that the reference marker 3 displayed in the part of the recorded image data among the turn guide line 83 and the composite image is turned in a counterclockwise direction on the screen 50a. That is, in order to reduce the turn angle of the recorded image data overlaid sequentially along with the turn of the vehicle 2 in the composite image creation processing, the turning radius recorded as the turn parameter in the data recording part 70 is shifted to a value larger than a current value. On the other hand, if the "right" button 30f has been operated, the turn parameter is changed so that the reference marker 3 displayed in the part of the recorded image data among the turn guide line 83 and the composite image is turned in a clockwise direction on the screen 50a. That is, in order to increase the turn angle of the recorded image data overlaid sequentially along with the turn of the vehicle 2 in the composite image creation processing, the turning radius recorded as the turn parameter in the data recording part 70 is shifted to a value smaller than a current value.

Back in FIG. 8, the calibrating part 64 determines the predicted position of the forward-backward frame border of the reference border 3 using the turn parameter after the change again, and displays the determined predicted position as the turn guide line 83 after the change on the display 50 (SE8). For example, in the processing at SE7, if shifting the turning radius recorded as the turn parameter to a value larger than the current value, the turn angle of the recorded image data rotated and overlaid sequentially along with the turn of the vehicle 2 is reduced. As the result, the turn guide line 83 on the screen 50a indicated in FIG. 10B is re-allocated as a straight line along the travel direction of the vehicle 2 (an up-down direction on the screen 50a) more compared to the turn guide line 83 on the screen 50a indicated in FIG. 10A.

Back in FIG. 8, the composite image creating part 62 executes the composite creation processing using the turn parameter after the change, and displays the created composite image on the display 50 superimposing the turn guide line 83 displayed at SE8 (SE9). For example, in the processing at SE7, if shifting the turning radius recorded as the turn parameter to a value larger than the current value, the forward-backward frame border of the first frame border 3a of the reference marker 3 on the screen 50a indicated in FIG. 10B is less curved than the same frame border on the screen 50a indicated in FIG. 10A, and displayed as a line along the turn guide line 83.

On the other hand, at SE6, if it is determined the position of the reference marker 3 included in the composite image matches the position of the turn guide line 83 (SE6: YES), it is assumed that the composite image creating part 62 rotates in an appropriate angle and overlays sequentially the recorded image data to create the composite image in the composite image creation processing and the calibrating part 64 terminates the turn parameter calibration processing.

Effects

According to the present embodiment, based on the position of the reference marker 3 included in the composite image that the composite image creating part 62 created according to a turn and the predicted position of the reference marker 3 superimposed and displayed on the composite image according to the turn, the turn parameter, which the movement status determining part 61 uses in determining a turn as the movement status based on the movement information, is calibrated. Consequently, even if a precise turn cannot be determined using the turn parameter and a precise composite image cannot be displayed based on the movement information due to the change of a movement characteristic relating to the turn such as the turning radius of the vehicle 2, the turn parameter can be calibrated based on a difference between the position of the reference marker 3 in the composite image and the predicted position thereof, and a precise composite image can be displayed by compositing the image data recorded in the data recording part 70 using the calibrated turn parameter.

In addition, based on the position of the reference marker 3 included in the composite image that the composite image creating part 62 created according to the straight movement and the predicted position of the reference marker 3 superimposed and displayed on the composite image according to a straight movement, the distance parameter, which the movement status determining part 61 uses in determining a movement distance as the movement status based on the movement information, is calibrated. Consequently, even if a precise movement distance cannot be determined using the distance parameter and a precise composite image cannot be displayed based on the movement information due to the change of a movement characteristic relating to the movement distance such as the change of the radius of tires along with the change of tires, the distance parameter can be calibrated based on the difference between the position of the reference marker 3 in the composite image and the predicted position thereof, and a precise composite image can be displayed by compositing the image data recorded in the data recording part 70 using the calibrated distance parameter.

In addition, based on the position of the reference marker 3 included in the overhead image that the overhead image creating part 63 created and the predicted position of the reference marker 3 superimposed and displayed on the overhead image according to the overhead conversion, the overhead parameter, which the overhead image creating part 63 uses in creating the overhead image, is calibrated. Consequently, even if a precise overhead image cannot be displayed using the overhead parameter due to a deviation of the installed position of the camera 40 or the like, the overhead parameter can be calibrated based on the difference between the position of the reference marker 3 in the composite image and the predicted position thereof, and a precise overhead image can be created using the calibrated overhead parameter.

A position marker corresponding to the position of the vehicle 2 is displayed in a part created based on the actual image data imaged by the camera 40 within the composite image that the composite image creating part 62 creates. Therefore, a target position when moving the vehicle 2 by the predetermined distance can be presented based on such position marker, regardless of whether or not the part created based on the recorded image data within the composite image is precise.

In the calibration processing, the distance parameter is calibrated after the overhead parameter was calibrated; therefore, the distance parameter can be calibrated based on the position guide line 81 and the distance guide line 82 displayed in a precise overhead image. Further, the turn parameter is calibrated after the distance parameter was calibrated; therefore, the turn parameter can be calibrated based on the composite image and the turn guide line 83 created using the correct distance parameter.

Problems to be solved by one or more embodiments of the invention and effects thereof are not limited to the contents described above, and may vary depending on the environment where such embodiment(s) of the invention is/are implemented and/or details of the configuration. Therefore, it is not excluded that in some embodiments only a part of the problems described above may be solved, or only a part of the effects described above may be accomplished.

Modified Embodiments

While various features have been described in conjunction with the embodiment according to the present invention, various modifications and/or improvements may be made without departing from the broad spirit and scope of the underlying principles. The examples of these alternatives are described below.

Reference Marker

In the above embodiment, it is described that the reference marker 3 used in each processing of calibration processing is configured with the frame borders of a plurality of rectangles that overlap in one side. However, different reference markers can be used in each processing. For example, in the overhead parameter calibration processing, only the first frame border 3a is used. In the distance parameter calibration processing, only the right-left frame borders of the first frame border 3a and the third frame border 3c may be used. In the turn parameter calibration processing, the forward-backward frame border of the first frame border 3a may be used.

What is claimed is:

1. A driving support device, comprising:
   an imaging unit for capturing images of a vicinity of a vehicle;
   an overhead image creating unit for creating an overhead image of an area including a position of the vehicle based on the images captured by the imaging unit;
   a recording unit for recording image data of the overhead image created by the overhead image creating unit;
   a movement status determining unit for acquiring movement information relating to movement of the vehicle and determining a movement status of the vehicle based on the acquired movement information;
   a composite image creating unit for, based on (i) the movement status determined by the movement status determining unit and (ii) a parameter associated with the movement status, compositing the image data of the overhead image recorded in the recording unit and creating a composite image of the area including the position of the vehicle;
   a displaying unit for displaying the composite image created by the composite image creating unit; and
   a calibrating unit for calibrating the parameter based on (a) a position of a reference marker included in the composite image created by the composite image creating unit according to the movement status and (b) a predicted position of the reference marker superimposed and displayed on the composite image according to the movement status, wherein
   the movement status includes a turn made by the vehicle;
   the parameter associated with the movement status includes a turn parameter being used by the composite image creating unit for creating the composite image; and
   the calibrating unit is configured for calibrating the turn parameter based on (a) the position of the reference marker included in the composite image that the composite image creating unit created according to the turn and (b) the predicted position of the reference marker superimposed and displayed on the composite image according to the turn.

2. The driving support device according to claim 1, wherein
   the movement status includes a straight movement made by the vehicle;
   the parameter associated with the movement status includes a distance parameter being used by the composite image creating unit for creating the composite image; and
   the calibrating unit is configured for calibrating the distance parameter based on (a) the position of the reference marker included in the composite image that the composite image creating unit created according to the straight movement and (b) the predicted position of the reference marker superimposed and displayed on the composite image according to the straight movement.

3. The driving support device according to claim 2, wherein
   the overhead image creating unit is configured for, using an overhead parameter, performing an overhead conversion on the images captured by the imaging unit to create the overhead image of the area including the position of the vehicle, and
   the calibrating unit is configured for calibrating the overhead parameter based on (a) the position of the reference marker included in the overhead image that the overhead image creating unit created and (b) the predicted position of the reference marker superimposed and displayed on the overhead image according to the overhead conversion.

4. The driving support device according to claim 3, wherein the calibrating unit is configured for calibrating the distance parameter after the overhead parameter.

5. The driving support device according to claim 4, wherein the calibrating unit is configured for calibrating the turn parameter after the distance parameter.

6. The driving support device according to claim 2, wherein the calibrating unit is configured for calibrating the turn parameter after the distance parameter.

7. A driving support method, comprising the steps of:
   capturing, by an imaging unit, images of a vicinity of a vehicle;
   creating, by an overhead image creating unit, an overhead image of an area including a position of the vehicle based on the images captured by the imaging unit;
   recording, in a recording unit, the overhead image created by the overhead image creating unit;
   acquiring movement information relating to movement of the vehicle and determining a movement status of the vehicle based on the acquired movement information;
   based on (i) the determined movement status and (ii) a parameter associated with the determined movement status, compositing the image data of the overhead image recorded in the recording unit and creating a composite image of the area including the position of the vehicle;
   displaying, on a display unit, the composite image created by the composite image creating unit; and
   calibrating the parameter based on (a) a position of a reference marker included in the composite image created by the composite image creating unit according to the movement status and (b) a predicted position of the reference marker superimposed and displayed on the composite image according to the movement status, wherein
   the movement status includes a turn made by the vehicle;
   the parameter associated with the movement status includes a turn parameter being used for creating the composite image; and
   the calibrating step comprises calibrating the turn parameter based on (a) the position of the reference marker included in the composite image created according to the turn and (b) the predicted position of the reference marker superimposed and displayed on the composite image according to the turn.

8. The driving support method according to claim 7, wherein
   the movement status includes a straight movement made by the vehicle;

the parameter associated with the movement status includes a distance parameter being used for creating the composite image; and the calibrating step comprises calibrating the distance parameter based on (a) the position of the reference marker included in the composite image created according to the straight movement and (b) the predicted position of the reference marker superimposed and displayed on the composite image according to the straight movement.

9. The driving support method according to claim 8, wherein the step of creating comprises, using an overhead parameter, performing an overhead conversion on the images captured by the imaging unit to create the overhead image of the area including the position of the vehicle, and the calibrating step comprises calibrating the overhead parameter based on (a) the position of the reference marker included in the overhead image and (b) the predicted position of the reference marker superimposed and displayed on the overhead image according to the overhead conversion.

10. The driving support method according to claim 9, wherein the distance parameter is calibrated after the overhead parameter.

11. The driving support method according to claim 10, wherein the turn parameter is calibrated after the distance parameter.

12. A non-transitory computer-readable medium containing thereon a driving support program that, when executed by a processor, causes the processor to perform the driving support method according to claim 7.

13. A non-transitory computer-readable medium containing thereon a driving support program that, when executed by a processor, causes the processor to perform the driving support method according to claim 10.

14. A non-transitory computer-readable medium containing thereon a driving support program that, when executed by a processor, causes the processor to perform the driving support method according to claim 8.

15. A non-transitory computer-readable medium containing thereon a driving support program that, when executed by a processor, causes the processor to perform the driving support method according to claim 9.

16. A non-transitory computer-readable medium containing thereon a driving support program that, when executed by a processor, causes the processor to perform the driving support method according to claim 11.

17. The driving support method according to claim 7, wherein the overhead image comprises (i) recorded image data of an image previously captured by the imaging unit and (ii) current image data of an image currently captured by the imaging unit.

18. The driving support method according to claim 7, further comprising:

adjusting the predicted position of the reference marker superimposed and displayed on the composite image according to the calibrated turn parameter.

19. The driving support method according to claim 7, further comprising:

recreating the overhead image according to the calibrated turn parameter; and displaying the recreated overhead image on the display unit.

20. The driving support method according to claim 19, wherein the position of the reference marker included in the recreated composite image after calibrating the turn parameter is different from the position of the reference marker included in the composite image before calibrating the turn parameter.

* * * * *